United States Patent
Baxter (10) Patent No.: US 11,920,925 B2
(45) Date of Patent: Mar. 5, 2024

(54) MEASURING TAPE WITH IMPROVED CENTER POST

(71) Applicant: APEX BRANDS, INC., Apex, NC (US)

(72) Inventor: Adam Lewis Baxter, Raleigh, NC (US)

(73) Assignee: Apex Brands, Inc., Apex, NC (US)

( * ) Notice: Subject to any disclaimer, the term of this patent is extended or adjusted under 35 U.S.C. 154(b) by 197 days.

(21) Appl. No.: 17/602,641

(22) PCT Filed: Apr. 9, 2020

(86) PCT No.: PCT/US2020/027425
§ 371 (c)(1),
(2) Date: Oct. 8, 2021

(87) PCT Pub. No.: WO2020/210459
PCT Pub. Date: Oct. 15, 2020

(65) Prior Publication Data
US 2022/0163308 A1     May 26, 2022

Related U.S. Application Data

(60) Provisional application No. 62/831,376, filed on Apr. 9, 2019.

(51) Int. Cl.
*G01B 3/1005*     (2020.01)
*G01B 3/1056*     (2020.01)

(52) U.S. Cl.
CPC ......... *G01B 3/1005* (2013.01); *G01B 3/1056* (2013.01); *G01B 2003/103* (2013.01)

(58) Field of Classification Search
CPC ................ G01B 3/1005; G01B 3/1056; G01B 2003/103; G01B 3/1043
See application file for complete search history.

(56) References Cited

U.S. PATENT DOCUMENTS 4,171,109 A    10/1979   Roe
4,462,160 A    7/1984   Cohen et al.
(Continued)

OTHER PUBLICATIONS

International Search Report and Written Opinion from International Application No. PCT/US2020/027425 dated Jun. 16, 2020, all pages cited in its entirety.
(Continued)

*Primary Examiner* — Yaritza Guadalupe-McCall
(74) *Attorney, Agent, or Firm* — Burr & Forman LLP (57) ABSTRACT

A measuring tape device may include a housing having an aperture, a reel assembly enclosed within the housing, and a blade having a first end configured to extend from the housing through the aperture and a second end configured to be wound on the reel assembly. The reel assembly may be configured to alternately allow the blade to be withdrawn from the reel assembly through the aperture or received in the aperture onto the reel assembly via operation of a spring. The spring is anchored to a post disposed within the housing at a first end of the spring and operably coupled to the blade at a second end of the spring. The post includes a slot dividing the post into a first post portion and a second post portion. Each of the first and second post portions may have rounded edges at portions thereof that define lateral boundaries of the slot.

18 Claims, 8 Drawing Sheets

(56) References Cited

U.S. PATENT DOCUMENTS

| | | | |
|---|---|---|---|
| 4,907,348 A | 3/1990 | Hubbard, Jr. | |
| 6,751,883 B2* | 6/2004 | Liao | G01B 3/1041 |
| | | | 33/761 |
| 6,811,109 B1* | 11/2004 | Blackman | G01B 3/1005 |
| | | | 242/375 |
| 6,892,468 B2 | 5/2005 | Murray | |
| 7,458,537 B2* | 12/2008 | Critelli | G01B 3/1005 |
| | | | 242/376 |
| 9,796,323 B1 | 10/2017 | Anderson | |
| 11,231,261 B2* | 1/2022 | Khangar | G01B 3/1056 |
| 2006/0266867 A1* | 11/2006 | Critelli | G01B 3/1005 |
| | | | 242/375 |
| 2019/0170491 A1* | 6/2019 | Khangar | G01B 3/1041 |
| 2022/0146244 A1* | 5/2022 | Khangar | G01B 3/1005 |
| 2022/0163308 A1* | 5/2022 | Baxter | G01B 3/1056 |

OTHER PUBLICATIONS

First Office Action in corresponding Chinese Application No. 202080034562.1 dated Jun. 20, 2023, all pages cited in its entirety.

\* cited by examiner

MEASURING TAPE WITH IMPROVED CENTER POST

CROSS-REFERENCE TO RELATED APPLICATIONS

This application claims the benefit of U.S. Provisional application No. 62/831,376, filed on Apr. 9, 2019, the entire contents of which are hereby incorporated by reference.

TECHNICAL FIELD

Example embodiments generally relate to measuring tape devices, and particularly relate to a measuring tape that is structured to have improved durability.

BACKGROUND

Measuring tapes have been around for a very long time, and are common measuring tools used in numerous contexts to obtain linear measurements. Measuring tapes can come in many forms and may be made of cloth, fiber glass, metal, plastic, or the like. The materials used are often dictated by the specific measuring application. For example, tailors and dressmakers typically use a flexible tape that can be easily manipulated between two hands to measure a distance therebetween. However, for construction or carpentry applications, a stiff and often metallic tape is preferred to allow the measuring tape to be extended between an a first location at which one end of the tape is anchored, and the location of the user at whose location the measuring tape is paid out from a reel assembly. The reel assembly may have a manual retracting mechanism or a self-retracting mechanism, typically depending upon the length of the measuring tape. For relatively short measuring tapes (e.g., 12 ft or 25 ft), self-retracting mechanisms are very common. For very long measuring tapes (e.g., larger than 100 ft), a manual retracting mechanism is typically employed. The self-retracting mechanism is often formed by employing a clock spring design.

In this regard, for example, the spring is typically anchored to a center post of the measuring tape device. As the blade is paid out, coils of the spring will typically wrap tighter and tighter around the center post to build up a retraction force in the spring. When allowed to retract, the spring unwraps and returns to a state of lower tension.

Repeated cycling of the process described above can create stress and fatigue in the spring, which is typically made of a rigid material such as steel. If the stress and fatigue reach sufficient levels, the spring itself may eventually fail at the location at which the spring is tightly wrapped around the center post. Thus, it may be desirable to introduce a design that reduces stress and fatigue and can therefore result in a longer lasting tape measure device.

BRIEF SUMMARY OF SOME EXAMPLES

Some example embodiments may enable the provision of a measuring tape that has an improved center post designed to reduce stress and fatigue on the interface between the spring and the center post.

In an example embodiment, a measuring tape device is provided. The measuring tape device may include a housing having an aperture, a reel assembly enclosed within the housing, and a blade having a first end configured to extend from the housing through the aperture and a second end configured to be wound on the reel assembly. The reel assembly may be configured to alternately allow the blade to be withdrawn from the reel assembly through the aperture or received in the aperture onto the reel assembly via operation of a spring. The spring may be anchored to a post disposed within the housing at a first end of the spring and operably coupled to the blade at a second end of the spring. The post may include a slot dividing the post into a first post portion and a second post portion. Each of the first and second post portions may have rounded edges at portions thereof that define lateral boundaries of the slot.

In another example embodiment, a post for supporting a spring operably coupled to a reel assembly of a measuring tape device is provided. The post may include a proximal end operably coupled to a first portion of a housing of the measuring tape device, a distal end operably coupled to a second portion of the housing such that the post extends from the proximal end to the distal end thereof along an axis about which the reel assembly rotates, and a slot extending through lateral sides of the post and through an axis of the post to divide the post into a first post portion and a second post portion. A spring that biases the reel assembly may be anchored to the post at a first end of the spring and operably coupled to a blade of the measuring tape device at a second end of the spring. Each of the first and second post portions may have rounded edges at portions thereof that define lateral boundaries of the slot.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

FIG. 5, which is defined by FIGS. 5A, 5B, 5C and 5D, illustrates views of a post of a reel assembly; and FIG. 6, which is defined by FIGS. 6A, 6B, 6C, 6D, 6E, 6F, 6G and 6H, illustrates views of a post of the reel assembly in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Figure 1:
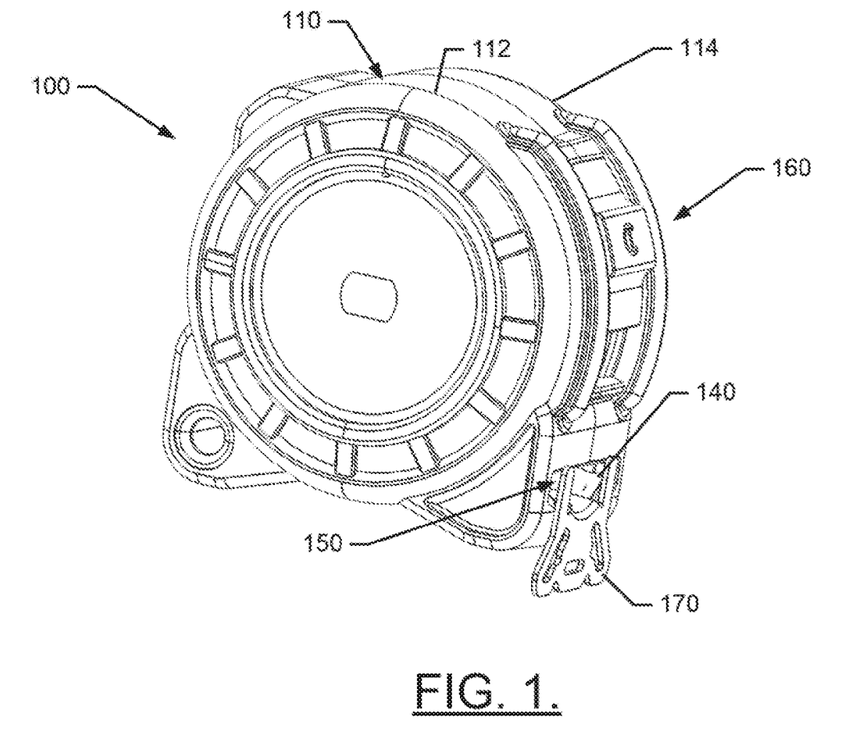
FIG. 1 illustrates a perspective view of a measuring tape device in accordance with an example embodiment.

As indicated above, some example embodiments may relate to the provision of a measuring tape device that may have an improved design for resistance to stress and fatigue in the spring of the self-retraction assembly. This may be accomplished by providing an improved center post design as described herein. FIG. 1 illustrates a perspective view of a measuring tape device, FIG. 2 illustrates a block diagram of such device, in accordance with an example embodiment, and FIG. 3 illustrates a front view of the measuring tape device to illustrate the case halves thereof.

Figure 2:
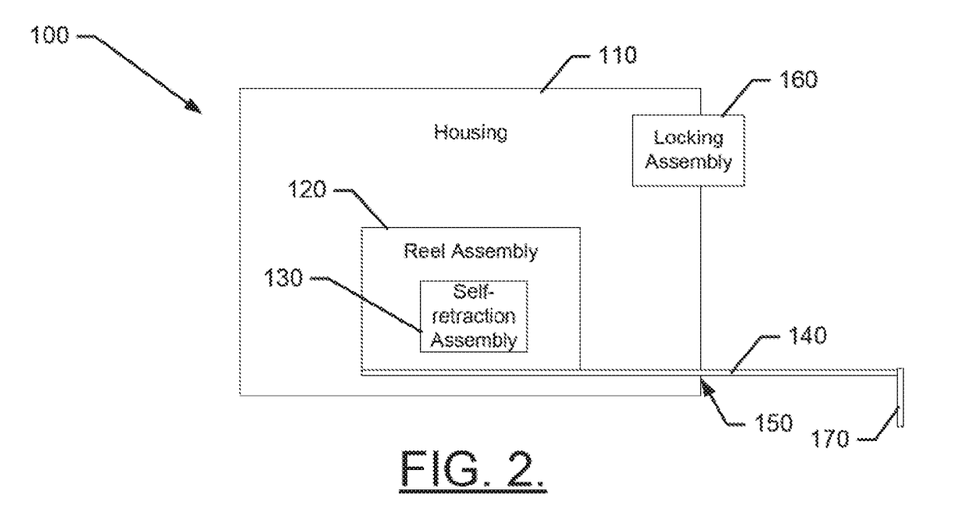
FIG. 2 illustrates a block diagram of the measuring tape device in accordance with an example embodiment.
Figure 3:
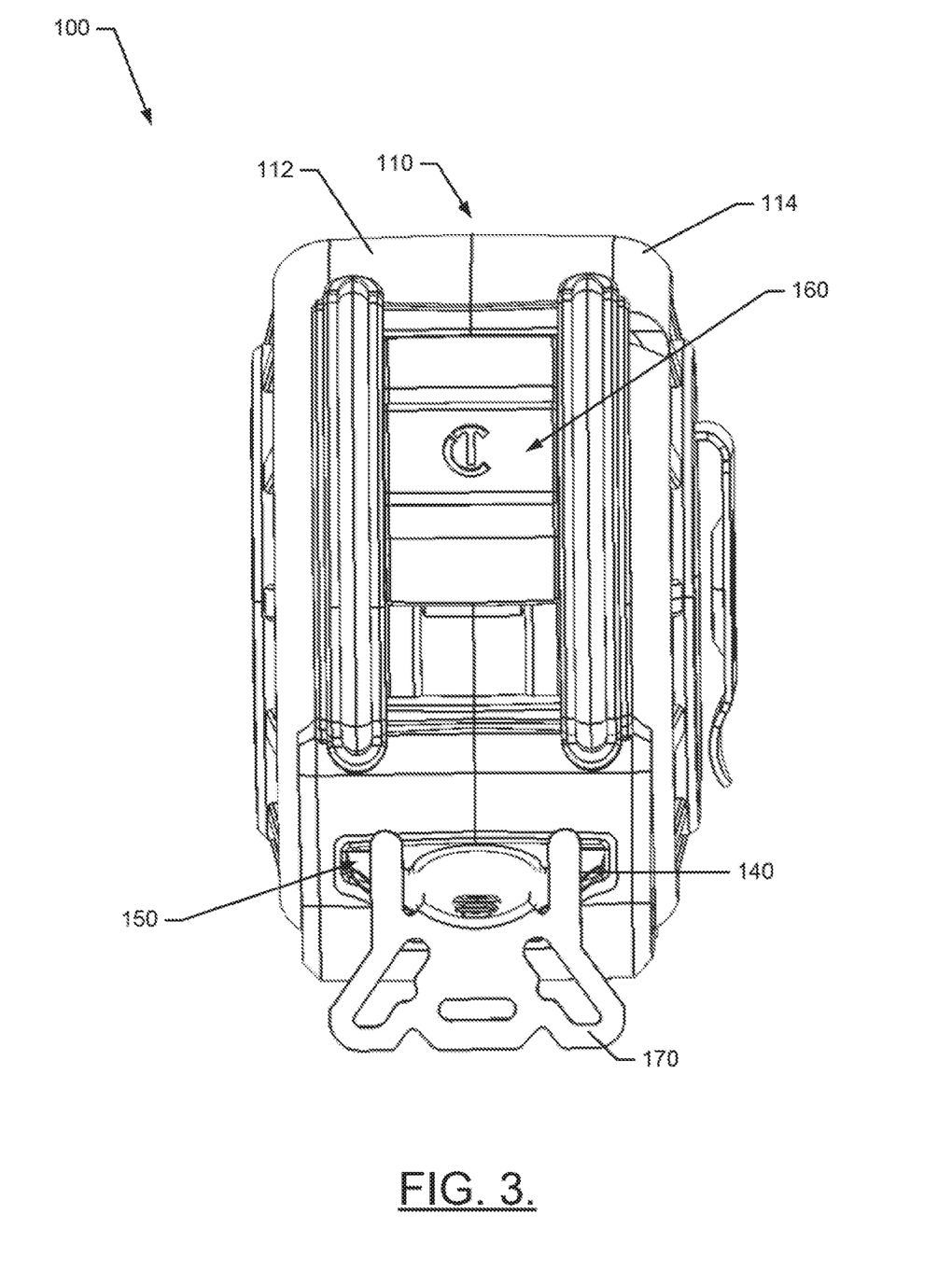
FIG. 3 illustrates a front view of the measuring tape device to illustrate the case halves thereof in accordance with an example embodiment.

Referring now to FIGS. 1-3, a measuring tape device 100 of an example embodiment may include a housing 110 comprising a first case half 112 and a second case half 114. The first and second case halves 112 and 114 may house a reel assembly 120 and a self-retraction assembly 130 therein. A blade 140 (or tape) portion of the device 100 may be wound onto the reel assembly 120. The blade 140 may be paid out through an aperture 150 formed in the housing 110. A locking assembly 160 may be provided to enable the reel assembly 120 to be locked to prevent the self-retraction assembly 130 from retracting the blade 140 when the locking assembly 160 is engaged.

The blade 140 has an end hook 170 disposed at one end thereof, and is operably coupled to the reel assembly 120 at the other end of the blade 140. The end hook 170 may be affixed (temporarily) to an anchor point on a medium that is to be measured. Once the end hook 170 is affixed to the anchor point, the blade 140 may be paid out of the aperture 150 and unwound from the reel assembly 120. When a desired length of the blade 140 has been paid out, the user can make any necessary markings, readings, etc., associated with measuring scale markings that may be printed on the blade 140. The measuring scale markings generally measure length from the end hook 170 in one or more units, with divisions and subdivisions of such units clearly marked on the blade 140.

By fixing the end hook 170 to the anchor point, the self-retraction assembly 130 (which is spring loaded, as will be discussed below) may be prevented from retracting the paid out portions of the blade 140 into the housing 110 (via the aperture 150). Similarly, when the locking assembly 160 is engaged, a force (e.g., a pinching force) may be placed on the blade 140 to prevent retraction or motion of the reel assembly 120 may otherwise be inhibited to prevent the self-retraction assembly 130 from retracting the paid out portions of the blade 140. However, when the end hook 170 is not anchored and the locking assembly 160 is not engaged, the self-retraction assembly 130 may cause the reel assembly 120 to wind the blade 140 back onto the reel assembly 120.

Figure 4:
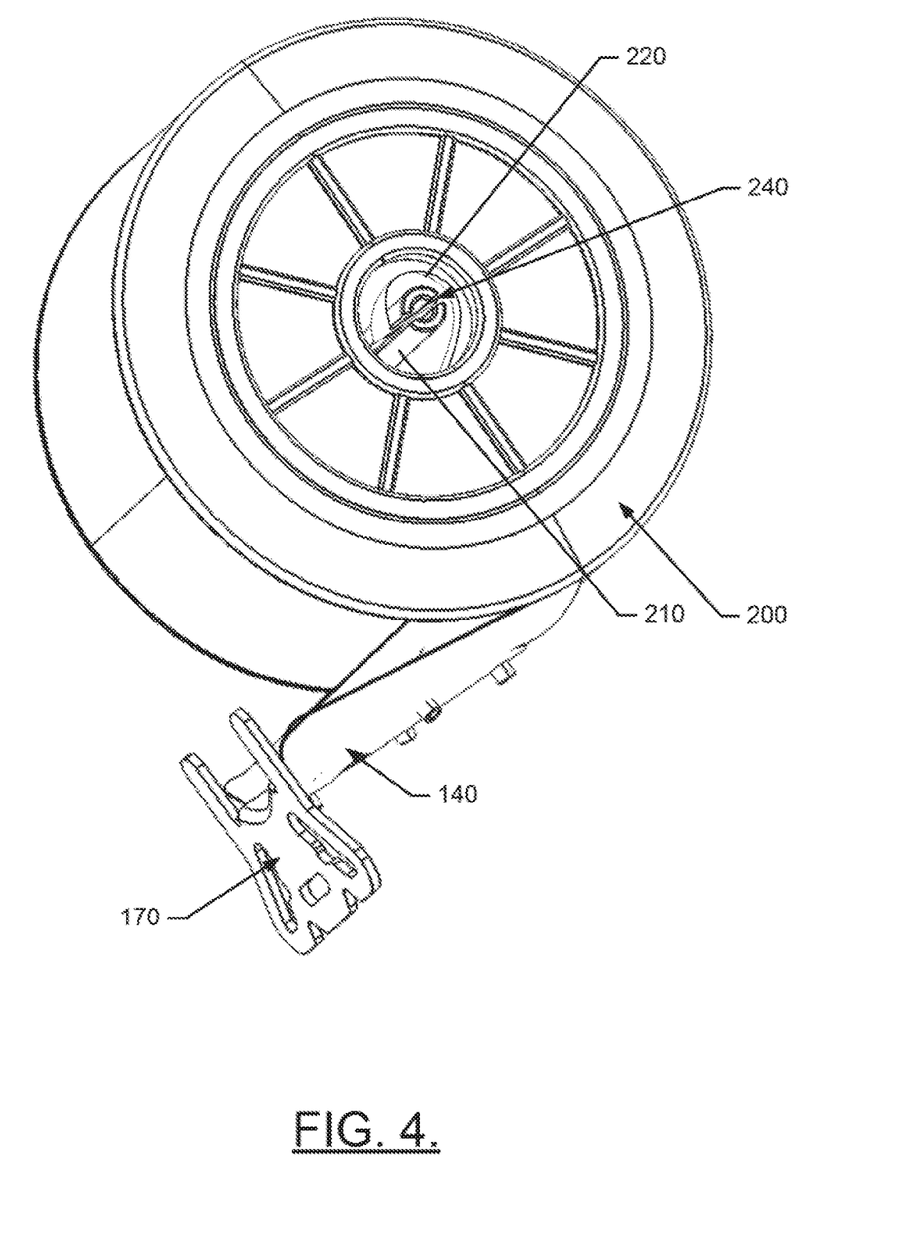
FIG. 4 illustrates a perspective view of a reel assembly and self-retraction assembly of the measuring tape device in accordance with an example embodiment.

As mentioned above, the self-retraction assembly 130 may be spring loaded. An example structure for a spring loaded self-retraction assembly 130 and some components that may support the same will now be described in reference to FIGS. 4-6. FIG. 4 illustrates a perspective view various components of the self-retraction assembly 130 and the reel assembly 120 in isolation. In this regard, FIG. 4 shows a reel 200 upon which the blade 140 is wound. The reel 200 is operably coupled to a center post 210 (or simply "post") via a spring 220. The spring 220 may be, for example, a mainspring, a torsion spring, a clock spring or the like. In this regard, the spring 220 may be anchored to the post 210 at one end (e.g., a proximal end relative to the post 210), and may be operably coupled to the blade 140 at the other end (e.g., the distal end relative to the post 210).

The post 210 may be formed in different ways and two examples are shown in FIGS. 5 and 6, respectively. In this regard, FIG. 5, which is defined by FIGS. 5A, 5B, 5C and 5D, illustrates a structure that is relatively easy to produce and may be considered to be similar to commonly used posts in some respects. Meanwhile, FIG. 6, which is defined by FIGS. 6A, 6B, 6C, 6D, 6E, 6F, 6G and 6H, illustrates an improved structure that improves the life of the spring 220 as described herein.

Referring now to FIGS. 4-6, the post 210 may be a substantially cylindrical rod extending away from a flange 230 over a majority of a length of the post 210. The post 210 may be affixed within the housing 110 to define an axis about which the reel 200 rotates. In this regard, the post 210 may be fixed to the first case half 112 via a flange 230. Meanwhile, the end of the post 210 that is opposite the flange 230 may be nested in or at least extend toward the second case half 114. Thus, in some cases, both ends of the post 210 may be supported by respective ones of the first and second case halves 112 and 114, and the post 210 may extend substantially perpendicular to the opposing external faces of the first and second case halves 112 and 114.

The post 210 may have a slot 240 formed therein. The slot 240 may typically be formed by machining the cylindrically shaped rod of the post 210 to remove material to result in the shapes and structures described herein. However, in some cases, the post 210 could be molded or cast to have the shapes and structures described herein, depending on the material used to form the post 210. For example, if metal is used to form the post 210, then the rod may be machined or cast. However, if plastic or other composite materials are used, the shaped described herein could either be molded or machined. In an example embodiment, the post 210 (and 210') may be die cast from a zinc alloy (e.g., Zinc alloy 3-Zamac 3). However, other metals could be used in alternative example embodiments.

The slot 240 may extend from a distal end of the post 210 (relative to the flange 230) toward the flange 230 (but may not extend all the way to the flange 230 in some cases). The slot 240 may be formed as a substantially planar section of removed material from the post 210 that extends through the axis of the post. In some cases, the slot 240 may extend along the longitudinal axis of the post 210 and pass entirely through opposing outer surfaces of the post 210 to bisect corresponding portions of the post 210 into two opposing post portions 250 and 252. The post portions 250 and 252 may mirror each other with respect to the slot 240. Moreover, the post portions 250 and 252 may each have a shape of a half cylinder (bisected along its axis). Thus, a cross section (taken perpendicular to the axis of the post 210) may be substantially half circular in shape.

In an example embodiment, the rod used to form the post 210 may be hollowed out over a portion thereof that is near the distal end of the post 210 (relative to the flange 230). The hollowed out portion of the rod may further be threaded in order to receive a screw that may pass through the housing 110 to secure the post 210 within the housing 110. The screw may also secure a clip (e.g., a belt clip) to the housing 110. In some cases, the rod that is used to form the post 210 may extend away from the flange 230 over about 90% of the length of the post 210. Meanwhile, the slot 240 may extend over at least 70% and less than 95% of the length of the rod, from the distal end thereof toward the flange 230. The hollowed out portion of the rod may extend over less than ⅓ of the length of the rod and greater than ⅕ of the length of the rod, extending inwardly from the distal end and toward the flange 230. This hollowed out portion (i.e., the screw thread portion) of the rod may effectively be formed as a hollow cylindrical shape with the slot 240 bisecting the hollow cylindrical shape along its axis.

The spring 220 may be anchored to the center post 210 by passing an end portion of the spring 220 (e.g., the proximal end, as noted above) through the slot 240. As shown in FIG. 4, the spring 220 may extend through the slot 240 and then be bent to wrap around the post 210. The tightness of the wrapping of the spring 220 around the post changes as the blade 140 is extended and retracted. In this regard, when the blade 140 is extended out of the housing 110, the reel 200 turns to pay out portions of the blade 140 and the spring 220 is more tightly wound with respect to the post 210. When the blade 140 is released and allowed to be retracted, the spring 220 unwinds with respect to the post 210 in order to turn the reel 200 and draw the blade 140 back into the housing 110.

Figure 5A:
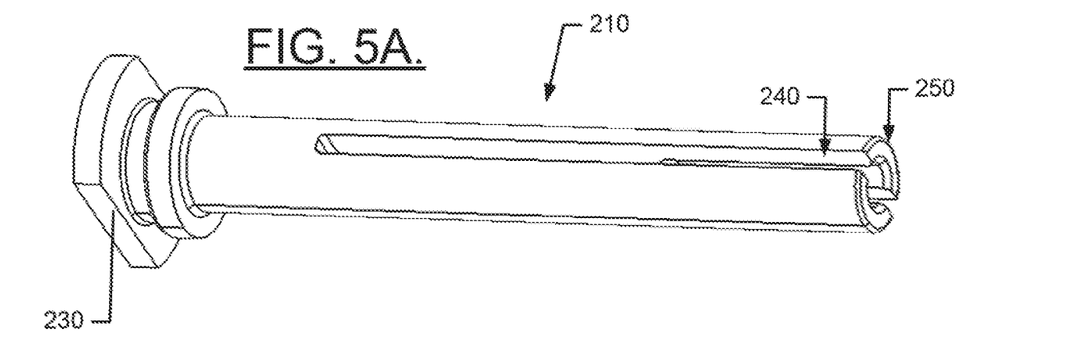
Figure 5B:
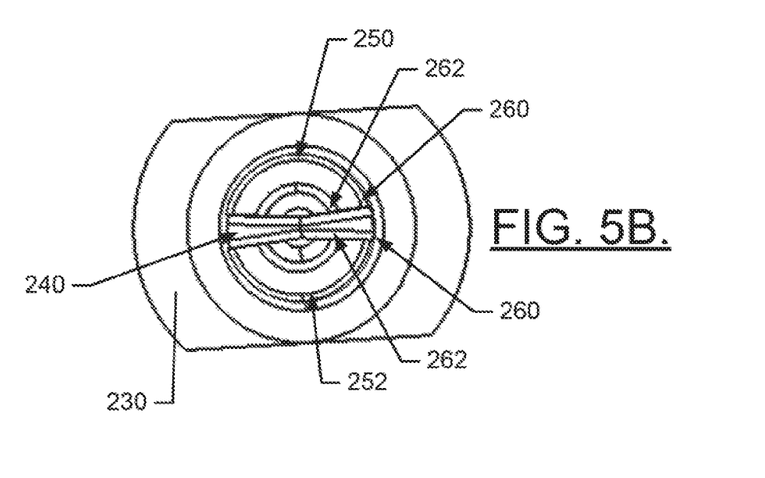
Figure 5C:
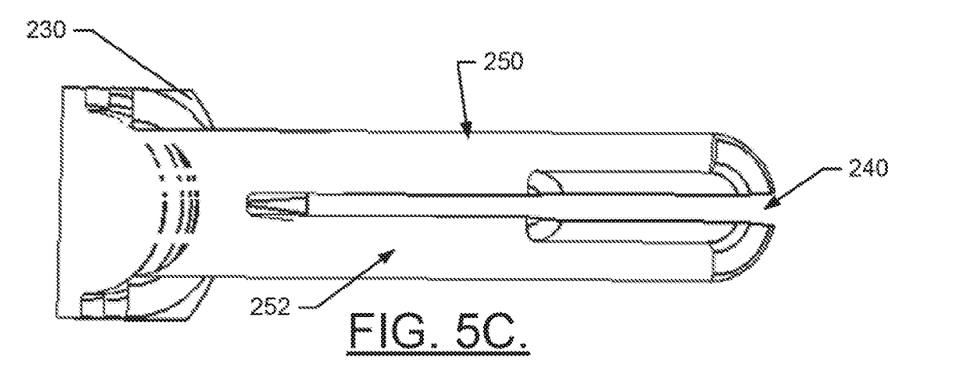
Figure 5D:
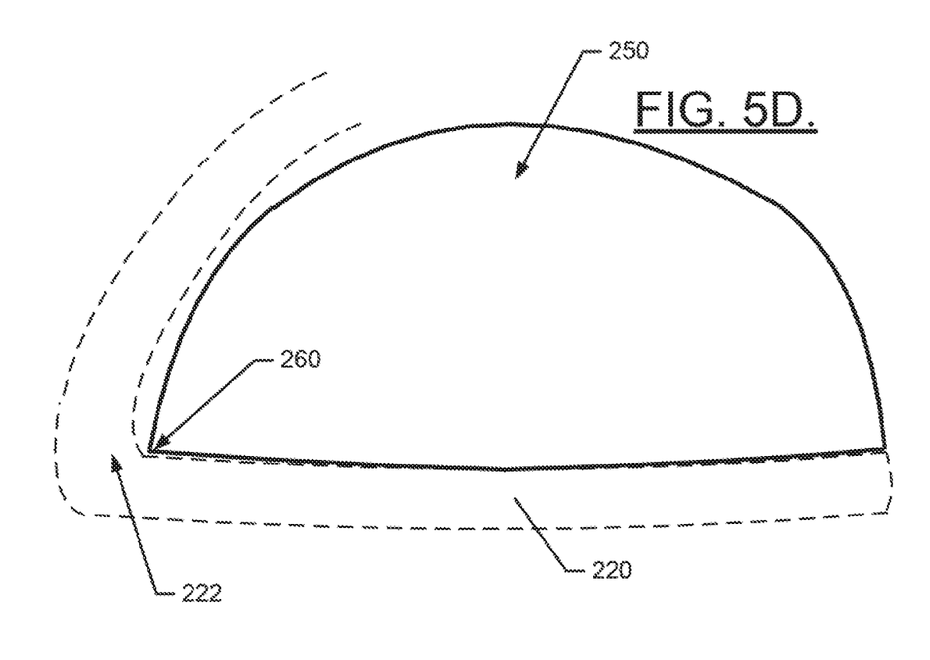

As can be appreciated from FIGS. 5A, 5B, 5C and 5D, an outer edge 260 may be formed on each side of the slot 240 to mark a lateral boundary or edge of the slot 240. Due to the way the slot 240 is formed in this case, the outer edge 260 of each of the post portions 250 and 252 may be relatively sharp. Moreover, an inner edge 262 formed in the hollowed out portion of the rod is also relatively sharp. Thus, when the spring 220 contacts these sharp edges of each of the outer edge 260 and inner edge 262 during a cycle of tighter winding of the spring 220 around the post 210 and release of the spring 220 to unwind with respect to the post 210, the stress and fatigue placed on the portions of the spring 220 that contact the outer edge 260 and inner edge 262 is exacerbated by the sharpness thereof. FIG. 5D shows a cross section view through a portion of the post portion 250 and the spring 220 to illustrate this situation. In this regard, the spring 220 extends along the post portion 250 toward the outer edge 260 and then makes a bend 222 out of the slot 240 and around an exterior of the post portion 250. The bend 222 may, in some cases, actually form a crease in the spring 220 due to the sharpness of the angle of the bend 222 (i.e., the small nature of the radius of the bend 222). To mitigate this effect, and thereby to reduce the stress and fatigue on the spring 220, some example embodiments may instead employ the post 210' of FIG. 6.

As shown in FIG. 6, the post 210' may be structured similarly to the post 210 shown in FIG. 5 except that the sharp edges are removed from the design completely. The rod used to form the post 210' may be identical to the rod used to form the post 210 of FIG. 5, and the materials used and processing of such materials may otherwise be similar to those described above. For example, in some cases, the formation of the slot 240 may be identical to the mechanisms described above, but then further machining may be applied to result in the structures described in reference to FIG. 6 below. Alternatively, if molding or casting could be used to form the structures described below, then such structures can be formed without using the structures of FIG. 5 as an intermediate stage. Regardless of how they are formed, the structures of the example of FIG. 6 may be less sharp, and more conducive to reduction of stress and fatigue on the spring 220 when the spring 220 passes through blade 140 withdrawal and retraction cycles.

Referring now to FIG. 6, the slot 240 may create two mirrored post portions 250' and 252'. As noted above, the slot 240 has lateral edges that extend the length of the slot 240 and are bounded by corresponding edges (formed at least in part by rounded edges 270) of the post portions 250' and 252'. However, the post portions 250' and 252' are not formed as half cylinders, as described above for post portions 250 and 252 of FIG. 5. Instead, the post portions 250' and 252' are formed to have a cross section (taken perpendicular to the axis of the post 210') that is substantially oval shaped or even oblong oval shaped. The oval or oblong oval cross section means that there are no sharp edges (i.e., no outer edge 260 and inner edge 262). As such, each of the post portions 250' and 252' is formed to have rounded edges 270 adjacent to the slot 240.

To the extent the distal end of the rod portion of the post 210' is hollowed out (as described above in reference to FIG. 5), the hollowed out portion is formed at an interior part of each respective one of the post portions 250' and 252' with respect to the slot 240. Thus, any sharp edge formed at the hollowed out portion is angled inwardly and would not place a sharp corner or edge in contact with the spring 220 in such a way as to impart any additional force on the spring 220 at the corresponding corner or edge.

Figure 6A:
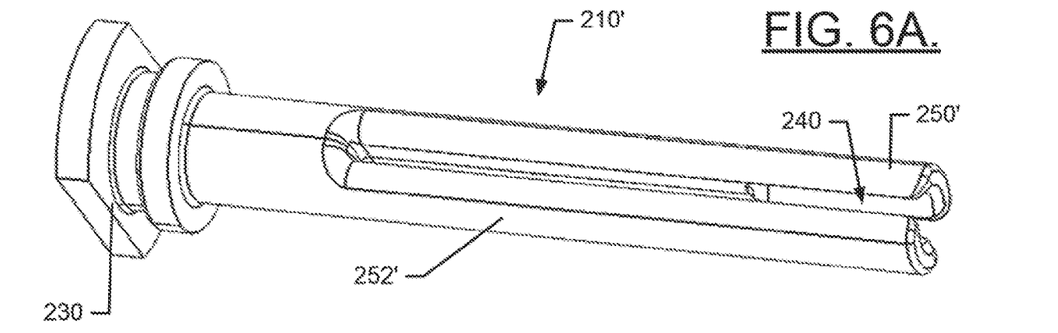
Figure 6B:
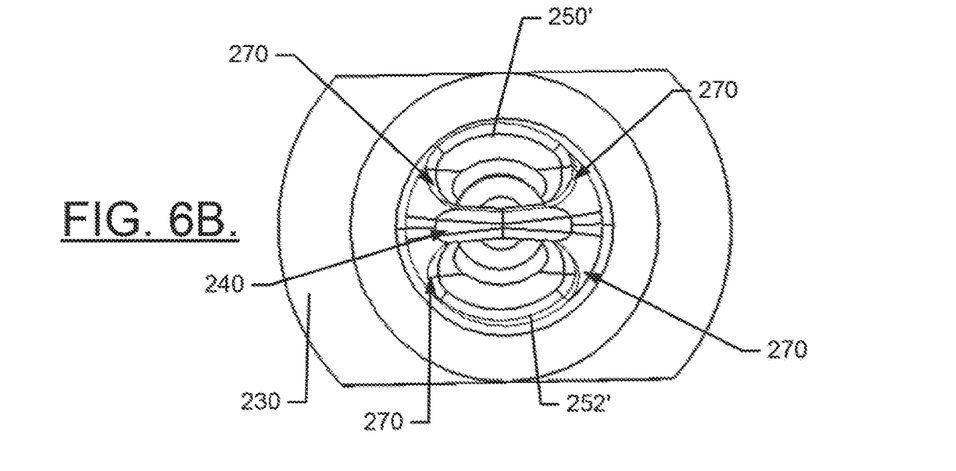
Figure 6C:
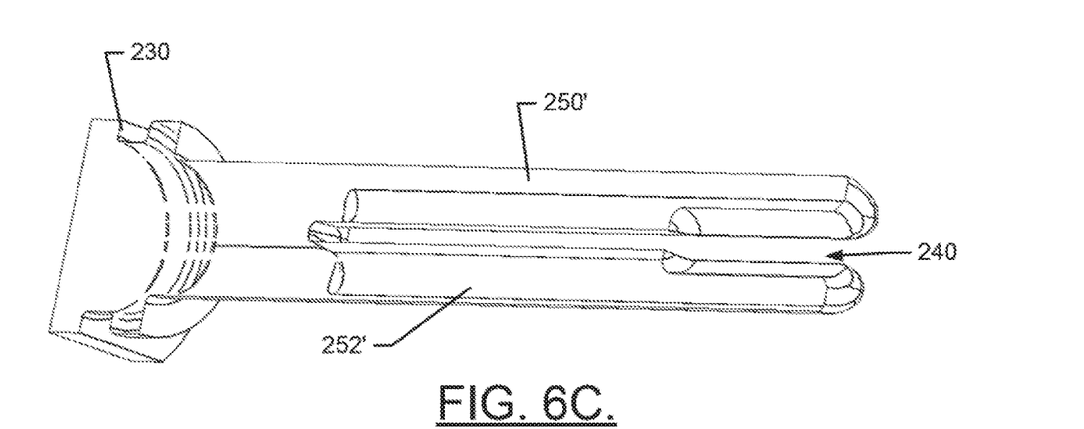
Figure 6D:
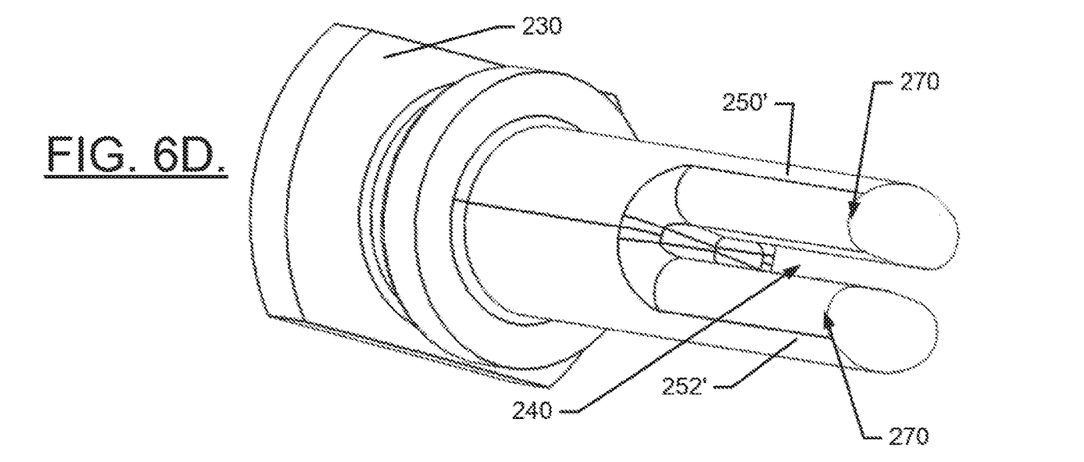
Figure 6E:
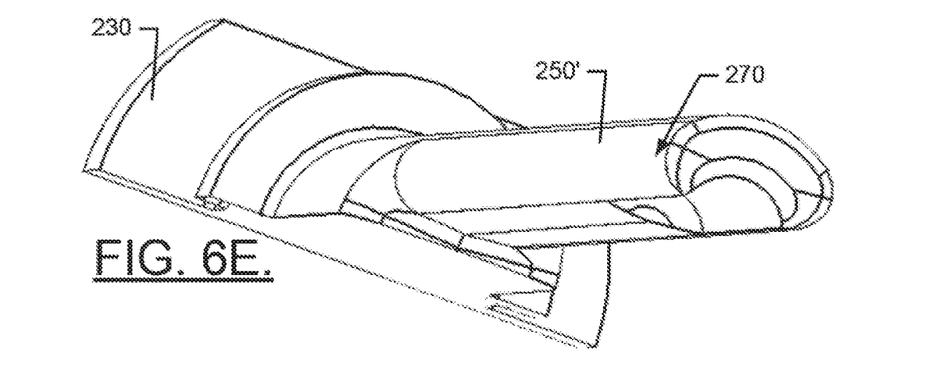
Figure 6F:
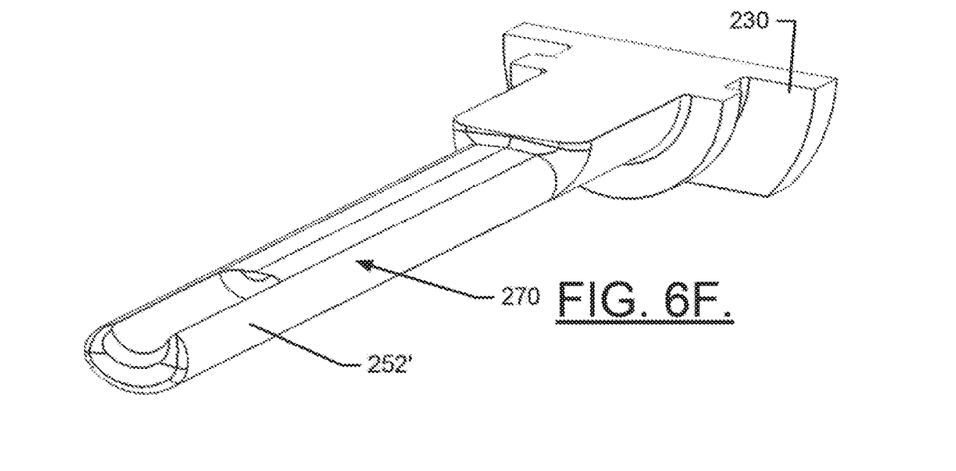
Figure 6G:
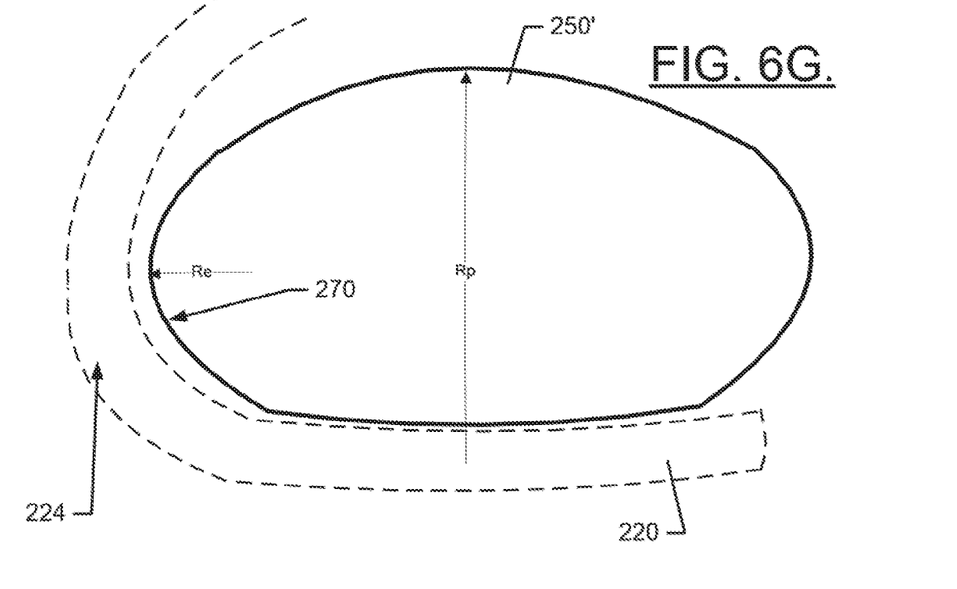
Figure 6H:
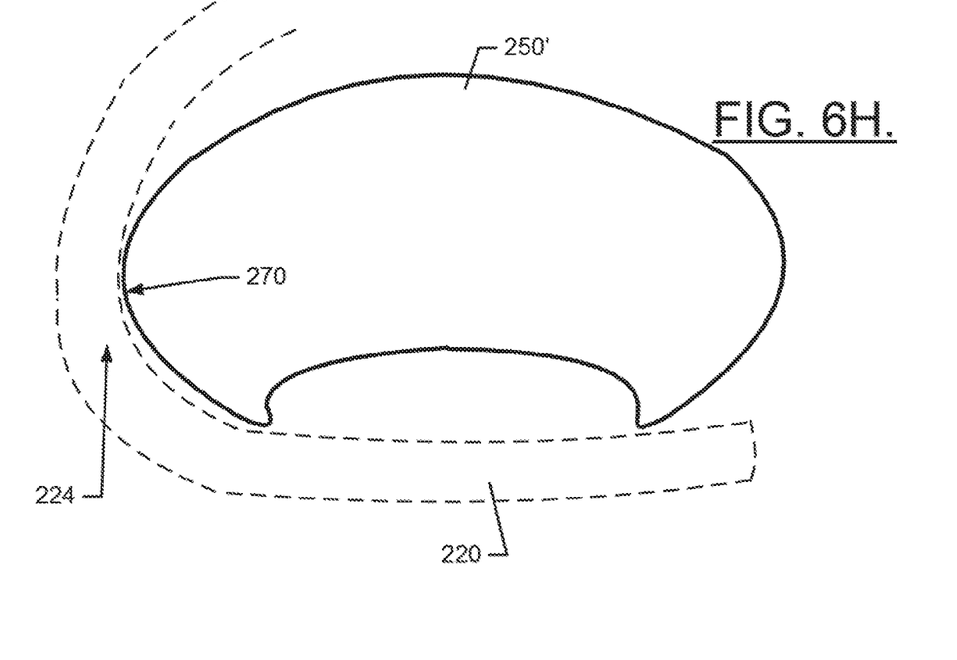

FIGS. 6G and 6H show cross sections of post portion 250' (FIG. 6H is a cross section at the hollowed out portion of the post portion 250') to illustrate the interaction between the rounded edges 270 and the spring 220. In this regard, the spring 220 can be seen to extend along the post portion 250' as described above in relation to FIG. 5D. However, at the rounded edge 270, the bend 224 of the spring 220 in this example has a much larger radius than the bend 222 of FIG. 5D. In some cases, the radius of the bend 224 may be at least twice as large as the radius of bend 222. Moreover, there may, in some cases, not be any crease formed in the spring 220 at all. The arc formed by the rounded edges 270 may be sufficient to allow a relatively small bend in the spring 220 as the material forming the spring 220 leaves the slot. In particular, the spring 220 may not be able to begin to bend until the spring 220 is almost entirely out (if not entirely out) of the slot 240 in the example of FIG. 5. However, the spring is enabled to bend while still technically in the slot 240 in the example of FIG. 6. As such, before the spring 220 exits the lateral sides of the slot 240, the spring 220 may already be curving to pass proximate to the rounded edge 270. Moreover, as scan be seen in FIG. 6G, a radius of an arc forming the rounded edge (Re) may be at least one 20% (and sometimes at least a quarter, one third or almost half) a radius of the post (Rp).

The example embodiment of FIG. 6 therefore provides a marked improvement over the design of FIG. 5 in relation to reducing stress and fatigue on the spring 220. By rounding out the edges of the post portions 250' and 252' to form the rounded edges 270 of FIG. 6, stress and fatigue are reduced, and the life of the spring 220 (and therefore also the measuring tape device 100) may be extended. Moreover, this improvement in performance can be accomplished without any change in the diameter of the post 210/210' or changing the material used for the spring 220. This allows life cycle extension to be provided without increasing the overall size of the measuring tape device 100 (i.e., to accommodate a larger post, which would dictate a larger drum or reel, and therefore also a larger case). It also avoids manipulations to the thickness, hardness or material used in the spring 220. A cheaper and lighter device may therefore be provided, which may be easier to carry on a utility belt for a worker. This may be particularly true when the utility belt has numerous other potentially heavy tools attached thereto. Thus, a smaller or more compact design for the measuring tape device 100 may nevertheless still have a very long useful life.

In an example embodiment, a measuring tape device is provided. The measuring tape device may include a housing having an aperture, a reel assembly enclosed within the housing, and a blade having a first end configured to extend from the housing through the aperture and a second end configured to be wound on the reel assembly. The reel assembly may be configured to alternately allow the blade to be withdrawn from the reel assembly through the aperture or received in the aperture onto the reel assembly via operation of a spring. The spring may be anchored to a post disposed within the housing at a first end of the spring and operably coupled to the blade at a second end of the spring. The post may include a slot dividing the post into a first post portion and a second post portion. Each of the first and second post portions may have rounded edges at portions thereof that define lateral boundaries of the slot.

In some embodiments, the features of the device described above may be augmented or modified, or additional features may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, in some cases the first and second post portions may each be structured to have a cross section in a direction substantially perpendicular to an axis of the post that has an oval shape. In some cases, the first and second post portions may each be structured to have a cross section in a direction substantially perpendicular to an axis of the post that has an oblong oval shape. In an example embodiment, the housing may include a first case half and a second case half, and a proximal end of the post may be anchored in the first case half via a flange and a distal end of the post may be operably coupled to the second case half. In some cases, the spring may be anchored to the post by passing the first end of the spring through the slot, and the spring may exit the slot and be routed around the post without forming a crease in the spring. In an example embodiment, a radius an arc formed by the rounded edges is at least 20% a radius of the post, or even at least one quarter or third a radius of the post. In some cases, the spring bends to at least partially conform to one of the rounded edges prior to the spring exiting a corresponding lateral boundary of the slot. In some embodiments, the first and second post portions mirror each other about the slot.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A measuring tape device comprising:
a housing having an aperture;
a reel assembly enclosed within the housing; and
a blade having a first end configured to extend from the housing through the aperture and a second end configured to be wound on the reel assembly;
wherein the reel assembly is configured to alternately allow the blade to be withdrawn from the reel assembly through the aperture or received in the aperture onto the reel assembly via operation of a spring,
wherein the spring is anchored to a post disposed within the housing at a first end of the spring and operably coupled to the blade at a second end of the spring,
wherein the post comprises a slot dividing the post into a first post portion and a second post portion, and
wherein each of the first and second post portions have rounded edges at portions thereof that define lateral boundaries of the slot.

2. The device of claim 1, wherein the first and second post portions are each structured to have a cross section in a direction substantially perpendicular to an axis of the post that has an oval shape.

3. The device of claim 1, wherein the first and second post portions are each structured to have a cross section in a direction substantially perpendicular to an axis of the post that has an oblong oval shape.

4. The device of claim 1, wherein the housing comprises a first case half and a second case half, and wherein a proximal end of the post is anchored in the first case half via a flange and a distal end of the post is operably coupled to the second case half.

5. The device of claim 1, wherein the spring is anchored to the post by passing the first end of the spring through the slot, and wherein the spring exits the slot and is routed around the post without forming a crease in the spring.

6. The device of claim 1, wherein a radius an arc formed by the rounded edges is at least 20% a radius of the post.

7. The device of claim 6, wherein a radius an arc formed by the rounded edges is at least one third a radius of the post.

8. The device of claim 1, wherein the spring bends to at least partially conform to one of the rounded edges prior to the spring exiting a corresponding lateral boundary of the slot.

9. The device of claim 1, wherein the first and second post portions mirror each other about the slot.

10. A post for supporting a spring operably coupled to a reel assembly of a measuring tape device, the post comprising:
a proximal end operably coupled to a first portion of a housing of the measuring tape device;
a distal end operably coupled to a second portion of the housing, the post extending from the proximal end to the distal end thereof along an axis about which the reel assembly rotates; and
a slot extending through lateral sides of the post and through an axis of the post to divide the post into a first post portion and a second post portion,
wherein a spring that biases the reel assembly is anchored to the post at a first end of the spring and operably coupled to a blade of the measuring tape device at a second end of the spring, and wherein each of the first and second post portions have rounded edges at portions thereof that define lateral boundaries of the slot.

11. The post of claim 10, wherein the first and second post portions are each structured to have a cross section in a direction substantially perpendicular to the axis of the post that has an oval shape.

12. The post of claim 10, wherein the first and second post portions are each structured to have a cross section in a direction substantially perpendicular to the axis of the post that has an oblong oval shape.

13. The post of claim 10, wherein the housing comprises a first case half and a second case half, and wherein the proximal end of the post is anchored in the first case half via a flange and the distal end of the post is operably coupled to the second case half.

14. The post of claim 10, wherein the spring is anchored to the post by passing the first end of the spring through the slot, and wherein the spring exits the slot and is routed around the post without forming a crease in the spring.

15. The post of claim 10, wherein a radius an arc formed by the rounded edges is at least 20% a radius of the post.

16. The post of claim 15, wherein a radius an arc formed by the rounded edges is at least one third a radius of the post.

17. The post of claim 10, wherein the spring bends to at least partially conform to one of the rounded edges prior to the spring exiting a corresponding lateral boundary of the slot.

18. The post of claim 10, wherein the first and second post portions mirror each other about the slot.

\* \* \* \* \*